(12) United States Patent
Toide et al.

(10) Patent No.: US 7,466,055 B2
(45) Date of Patent: Dec. 16, 2008

(54) PERMANENT-MAGNET SYNCHRONOUS MOTOR

(75) Inventors: Yukari Toide, Tokyo (JP); Akihiro Daikoku, Tokyo (JP); Masatsugu Nakano, Tokyo (JP); Hideaki Arita, Tokyo (JP); Shinichi Yamaguchi, Tokyo (JP); Moriyuki Hazeyama, Tokyo (JP); Takashi Yoshioka, Tokyo (JP); Tomohiro Kikuchi, Tokyo (JP); Katsumi Hayami, Tokyo (JP); Takashi Miyazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 438 days.

(21) Appl. No.: 10/540,157

(22) PCT Filed: Aug. 26, 2004

(86) PCT No.: PCT/JP2004/012289

§ 371 (c)(1),
(2), (4) Date: Jun. 21, 2005

(87) PCT Pub. No.: WO2005/025037

PCT Pub. Date: Mar. 17, 2005

(65) Prior Publication Data
US 2006/0049713 A1 Mar. 9, 2006

(30) Foreign Application Priority Data

| Sep. 4, 2003 | (JP) | ................. 2003-312214 |
| Jan. 22, 2004 | (JP) | ................. 2004-014850 |
| Jan. 23, 2004 | (JP) | ................. 2004-015309 |

(51) Int. Cl.
*H02K 1/00* (2006.01)

(52) U.S. Cl. .................................................. 310/216

(58) Field of Classification Search ................. 310/216, 310/254; *H02K 21/00, 5/18*
See application file for complete search history.

(56) References Cited

U.S. PATENT DOCUMENTS 5,783,892 A  7/1998  Kanzaki et al.
7,268,459 B2 * 9/2007  Baba et al. .................. 310/216

(Continued)

FOREIGN PATENT DOCUMENTS

JP  6-52346(U)  7/1994

(Continued)

OTHER PUBLICATIONS

Daikoku et al., "Cogging Torque Examination in Permanent Magnet Motors with Stressed Stator Core", The papers of Technical Meeting on Rotating Machinery IEE Japan, RM 03-152, pp. 13-18.

(Continued)

*Primary Examiner*—Nguyen N Hanh
(74) *Attorney, Agent, or Firm*—Leydig, Voit & Mayer, Ltd.

(57) ABSTRACT

In a combination of, for example, a rotor having eight magnetic poles and a stator having twelve slots and pulsating components of permeance, which generate a sinusoidal cogging torque having maxima of the same number as the number of poles of the rotor, pressurizing parts arranged in predetermined positions applying a force at an outer periphery of the stator directed inwardly to cancel the pulsating components of the cogging torque.

6 Claims, 11 Drawing Sheets

U.S. PATENT DOCUMENTS

2002/0135244 A1    9/2002    Strong et al.

FOREIGN PATENT DOCUMENTS

| | | |
|---|---|---|
| JP | 9-023687 | 1/1997 |
| JP | 2000-217284 | 8/2000 |
| JP | 2000-217284 | 9/2000 |
| JP | 2001-095199 | 4/2001 |
| JP | 2001-218429 | 8/2001 |
| JP | 2001-258225 | 9/2001 |
| JP | 2002-058231 | 2/2002 |
| JP | 2002-233103 | 8/2002 |
| JP | 2002-272074 | 9/2002 |
| JP | 2006-223015 * | 8/2006 |

OTHER PUBLICATIONS

Daikoku et al., "Cogging Torque Examination in Permanent Magnet Motors with Stressed Stator Core", The papers of Technical Meeting on Rotating Machinery IEE Japan, RM 03-152, pp. 13-18, Nov. 20, 2003.

* cited by examiner (a)

(b)

PERMANENT-MAGNET SYNCHRONOUS MOTOR

TECHNICAL FIELD

The present invention relates to a permanent-magnet type synchronous motor contributory to reduction in cogging torque, and a method of manufacturing the same.

BACKGROUND ART

Cogging torque in an inner rotor type permanent-magnet type synchronous motor comprises pulsating components in torque, which is generated between teeth of a stator core (stator iron core) and a magnet rotor (rotor) when the magnet rotor is rotated by an external drive at the time of non-current-carrying to a winding, and only an order of a least common multiple of the number 2 p of magnetic poles of a rotor magnet and the number Z of teeth (slots) of a stator core appears theoretically (see Non-Patent Document 1). However, this theory is limited to the case where rotors (mainly, magnets) and stator cores are uniform in shape and material properties and manufactured completely symmetrically with respect to the number of poles and the number of slots.

Since the number of poles and the number of slots get out of symmetric property in real machines, in particular, in a field of volume production, however, components of cogging torque having lower orders than the order of the least common multiple appear in many cases at large amplitudes. An increase in cogging torque has a great influence upon performance of products because of causing degradation in positioning accuracy for servomotors and degradation in feeling of steering for motors for automotive power steering.

Returning to the principle of torque generation, an explanation will be given to a mechanism for generation of pulsating components in torque. Torque is related to magnetic flux density and increases in the case where magnetic flux is easy to pass. Easiness, with which magnetic flux passes, is called permeance (reciprocal of magnetic resistance), and torque is generated in proportion to the square thereof. Accordingly, when permeance is varied, cogging torque is generated. In the case where a magnet making a source of generation of magnetic flux involves a nonuniform distribution and a symmetric property inconsistent with the number of poles, these are sensed on a side of a stator and pulsation having orders consistent with the number of slots and higher order components thereof appears. Higher order components are composed of higher harmonic wave components, which nonuniform components do not necessarily make a near-sinusoidal wave change to thereby cause.

Since main magnetic flux passes through an air from a magnet to return to the magnet through a back yoke portion from teeth of a stator core, materials of passages are divided into two. One is an air which is present between a rotor and a stator, and the other is a magnetic body that makes a core (iron core) In recent years, a laminate of flat rolled magnetic steel sheets and strip is in many cases used for such magnetic body, the magnetic property of flat rolled magnetic steel sheets and strip causes a problem frequently. In the case where flow of main magnetic flux involves a nonuniform distribution and a symmetric property inconsistent with the number of slots, these are sensed on a side of a rotor and pulsation having orders consistent with the number of poles and higher order components thereof appears.

For passages of magnetic flux, magnetic permeability $\mu$ indicative of easiness, with which magnetic flux passes, is constant in an air, so that a quantity of magnetic flux in the air appears due to a change in length of gaps (air gaps). Physical quantities having an influence on main magnetic flux moving through a rotor magnet and stator teeth are roughly classified into two, one of which is a gap (called an air gap) indicative of a shortest distance between an outside diameter of the rotor magnet and the stator teeth, and the other of which is a gap (generally called an open width) between the adjacent stator teeth. While an air gap is determined by an outside diameter shape of a rotor and an inside diameter shape of a stator, the inside diameter shape of a stator causes a problem in many cases.

Also, in the case where in order to facilitate a winding process, a method, in which a core is partially or wholly divided between teeth, is employed instead of manufacturing a stator core from a substantially circular-shaped unitary core, minute clearances are present to make clearance gaps when the divided portions are joined together.

Also, in the case where a core is partially divided and joined after winding, for convenience of a joint process, such part is in some cases made different in structure from the remaining part whereby non-uniformity in structure is generated.

Subsequently, cores manufactured from a magnetic body such as flat rolled magnetic steel sheets and strip generate, in many cases, individual differences in magnetic permeability due to various factors and a nonuniform distribution in the same individual one. One of the factors for generation of individual differences is a composition (grade) of flat rolled magnetic steel sheets and strip being a core material. Also, one of the factors for generation of differences in the same individual one is due to those different magnetic permeabilities in specific portions of a core obtained by a method of punching a core shape, which are caused by a difference (called magnetic anisotropy) in magnetic property between a direction of rolling of, for example, flat rolled magnetic steel sheets and strip and a direction perpendicular thereto. Also, when flat rolled magnetic steel sheets and strip are punched by blades of a metallic die, forces exerted by the blades cause degradation of teeth end surfaces in magnetic permeability, and the process of fitting of concave and convex portions (called caulking) for fixation of a laminate causes degradation of a caulked portion and its neighborhood.

Further, the manufacturing process of mounting a frame on an outer periphery of a stator core to fix the same to a bracket that supports a bearing is in many cases performed in order to prevent a stator from being displaced by torque generated between a rotating rotor and the stator, but a force exerted on the outer periphery of the stator core by the frame has an influence on not only a neighborhood of the outer periphery of the stator core, through which magnetic flux does not pass so much, but also a neighborhood of teeth, which makes a main passage, to cause degradation of flat rolled magnetic steel sheets and strip, which makes a main passage of magnetic flux, in magnetic property and displacement of teeth, thus changing an inside diameter shape of the stator core.

Unless gaps and magnetic property are ideally uniformly formed for the number of poles and the number of slots, cogging torque of lower orders is generated.

As described above, cogging torque of orders consistent with the number Z of slots is generated due to non-uniformity on a side of a magnet, and cogging torque of orders consistent with the number 2 p of poles is generated due to various factors, such as non-uniformity in air gap, non-uniformity in open width, non-uniformity in clearance gap, distribution of magnetic property with respect to magnetic anisotropy of flat rolled magnetic steel sheets and strip, distribution of magnetic property generated by partial degradation of magnetic permeability due to punching, caulking, and stress in a frame, nonuniform distribution of clearance gaps of a split core, structural non-uniformity of joints, etc.

These factors are inevitably generated in actual motors by a manufacturing method for enhancement in volume production, or a limit in working accuracy in manufacturing processes.

Trials for reduction in cogging torque have been made taking notice of such manufacturing processes. For example, in order to obtain uniformity in air gaps, JP-A-2001-218429 (see Patent Document 1) proposes measures of ensuring roundness of inside diameter by uniformly applying pressure over outer and inner peripheries of a core to fix the same when a stator is to be press fitted into a frame. In JP-A-09-23687 (see Patent Document 2), it is tried to reduce cogging torque due to magnetic anisotropy by displacing a direction of magnetic anisotropy from central angles of teeth.

Also, in JP-A-2001-95199 (see Patent Document 3), it is tried to prevent an increase in cogging torque by maintaining a frame as uniform as possible in thickness to maintain a force given to a stator by the frame uniformly and to prevent the stator from being nonuniformly changed in inside diameter shape. In JP-A-2001-258225 (see Patent Document 4) and JP-A-2002-272074 (see Patent Document 5), measures for restriction on the number of caulked portions have been proposed taking account of influences by caulking. Further, in JP-A-06-52346 (see Patent Document 6), lamination is made so as to arrange seams circumferentially at substantially equal intervals whereby it is tried to dissolve non-uniformity in magnetic flux, which is caused by the seams.

The inventors of the present application have researched components having the same orders as the number 2 p of poles, among cogging torque having a smaller number of pulsation than a least common multiple of the number 2 p of poles of a magnet and the number Z of slots of a stator and clarified that products manufactured in volume production appear in many cases as a result of superposition of cogging torque waveforms including an amplitude and a phase, of at least two or more factors. Accordingly, a fundamental understanding is obtained, in which measures taking notice of only one property as in the prior art are insufficient to enable adequately reducing cogging torque and measures for individual properties, for example, trying to make roundness approach zero cannot materialize a complete ideal state actually. In particular, for actual motors manufactured in volume production, it is difficult to unlimitedly make cogging torque approach zero without taking account of working accuracy. That is, a technique is demanded, in which cogging torque caused by working accuracy is grasped as net and cogging torque measured in a final stage of the manufacturing process is cancelled to be made zero.

Non-Patent Document 1: Materials of workshop of rotating machinery of Electric Appliance Society RM-03-152 (2003)
  Patent Document 1: JP-A-2001-218429
  Patent Document 2: JP-A-09-23687
  Patent Document 3: JP-A-2001-95199
  Patent Document 4: JP-A-2001-258225
  Patent Document 5: JP-A-2002-272074
  Patent Document 6: JP-A-06-52346

In permanent-magnet type synchronous motors, cogging torque having the same orders as the number 2 p of poles of a magnet is generated due to composite superposition of various factors, such as non-uniformity in air gap, non-uniformity in open width, non-uniformity in clearance gap, distribution of magnetic property with respect to magnetic anisotropy of flat rolled magnetic steel sheets and strip, distribution of magnetic property generated by partial degradation of magnetic permeability due to punching, caulking, and stress in a frame, nonuniform distribution of clearance gaps of a split core, structural non-uniformity of joints, etc. In this case, it is necessary to take notice of superposition of cogging torque waveforms including not only amplitudes but also phases, and it is necessary to take canceling measures to make cogging torque, which appears as a result of superposition, approach zero as consequence, in addition to taking compensating measures to separate and correctly estimate respective factors, in which amplitudes negate other properties and is apparently decreased, and to reduce individual amplitudes.

The invention has been thought of in order to solve the problems described above, and has its object to provide a permanent-magnet type synchronous motor, in which cogging torque having pulsating components of the same orders as the number 2 p of poles of a magnet is decreased near to zero unlimitedly by separating composite individual factors of cogging torque and taking thorough measures of reducing the cause of large amplitudes in an experimental manufacturing stage, and regulating processes to superpose properties, in which phase control is possible, on properties, in which amplitudes cannot be decreased for the convenience of manufacture, to cancel the latter, and a method of manufacturing the same.

SUMMARY OF THE INVENTION

The invention comprises a stator having Z (Z is a natural number) slots, on which a coil is arranged, a rotor having permanent magnets of 2 p (p is a natural number) poles and inserted into a torus of the stator, and a frame that pressurizes an outer periphery of the stator inward in N locations (N is a natural number) with larger forces than those for other portions. Specifically, in case of shrinkage fit and a molding process, a frame, an external form of which is not a torus but has is substantially square to have a thickness distribution, may be made use of, and in the case where the frame is substantially a torus in shape, pressurizing parts such as spacer, etc. are partially added to make pressurized regions N in number. In the case where the frame is not substantially circular in outer shape and pressurized points are smaller in number than N, pressurizing parts are added to increase pressurized points in number. In case of using pressurization or pressurizing parts, a mechanism is made capable of adjusting pressurized regions and a degree of pressurization.

In processes until mounting of the frame, marking affording discrimination of individual teeth or slots of the stator is made in one or more locations and made a reference position. In the case where a split core is adopted to include seams as joined, the seams can be made a reference position. In a stage of trial manufacture, with respect to cogging torque having components of the same orders as the number 2 p of poles and caused by the stator, a state of generation is separated by characteristics and grasped in a manufacturing process before mounting of the frame by measuring cogging torque of a stator without a frame, or measuring cogging torque of a stator, on which a torus having a high accuracy in shape and subjected to influences of stress by the frame as small as possible is experimentally mounted.

In a process of mounting the frame on the stator, a feature resides in that fixation is made after the positional relationship between the reference position of the stator and pressurizing regions in N locations on the frame is determined in terms of N number and an angle, which cancel the state of cogging torque before mounting of the frame. Angles between the reference position and pressurized points are determined on the basis of data, in which cogging torque generated in a manufacturing process before mounting of the frame and the cause for generation of the cogging torque are separated by characteristics.

According to the invention, it is possible to obtain a permanent-magnet type synchronous motor, in which cogging torque attributable to non-uniformity of a stator is cancelled to decrease an entire cogging torque, by giving to predetermined locations on the stator non-uniformity of magnetic property caused by stress, air gap on an inside diameter caused by stress, open width, and displacement of clearance gap.

EMBODIMENT 1

Figure 1:
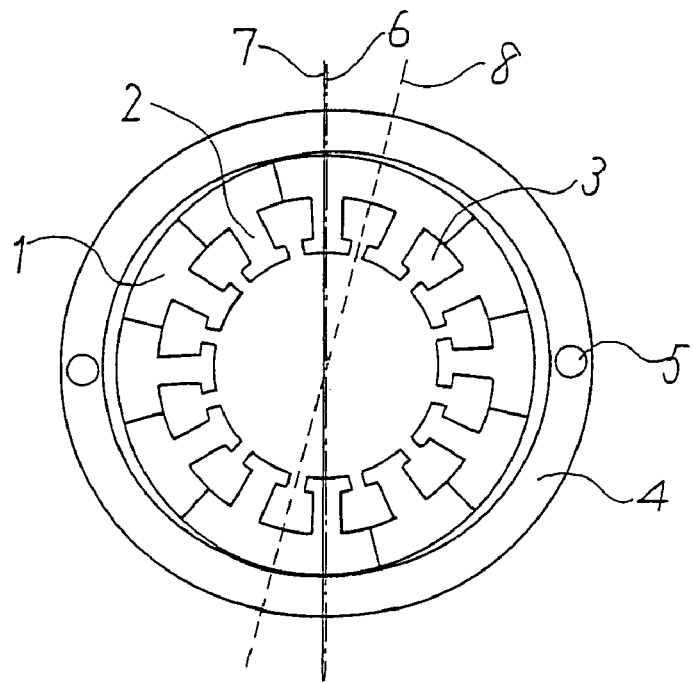
FIG. 1 is a view showing a cross section of a permanent-magnet type synchronous motor perpendicular to an axial direction of a stator, according to an embodiment 1 of the invention.

FIG. 1 is a view illustrating a method of assembling a motor in the embodiment 1 to carry out the invention. In FIG. 1, a stator iron core (stator core) 1 is constituted by laminating flat rolled magnetic steel sheets and strip, in which twelve teeth 2 and twelve slots 3 are formed. A frame 4 (referred below to as circular frame) is predetermined to be circular as a cross sectional shape of a frame 4 perpendicular to a rotor rotating shaft (not shown) in this example. Screw holes 5 for assembly of a rotor and a stator are provided to be opposed to each other at an angle of 180 degrees. Since the frame 4 is machined conforming a die, it is substantially equivalent in form accuracy to the die, and a shape of that hole of the frame 4, which accommodates therein the stator iron core 1, is not so high in roundness (a difference of maximum/minimum dimensions of an inside diameter), the shape being an elliptical shape of, for example, about 120 μm for products of a certain series.

FIG. 1 shows a straight line 6 indicative of a minor axis of the elliptical shape. Also, an outside diameter shape of the frame 4 is substantially similar to an inside diameter shape, and has an elliptical shape. Accordingly, the frame 4 is substantially constant in thickness in a circumferential direction and it is found that as a result of shape measurement that the screw holes 5 for mount are surely located in a direction of major axis of the ellipse. Accordingly, the thickness of the frame on the major axis is decreased by a magnitude amounting to a diameter of the screw holes.

On the other hand, the stator iron core 1 is generally fabricated by laminating cut portions of flat rolled magnetic steel sheets and strip while caulking them, and an outside diameter of the stator iron core 1 has a roundness of, for example, 50 μm or less and is in many cases said to be substantially circular as compared with the shape of the hole of the frame 4.

Conventionally, when the stator iron core 1 is to be inserted into and fixed to the hole of the frame 4, the positional relationship of the frame 4 and the stator iron core 1 in a direction of rotation about a rotor rotational axis is not taken account of, but the stator iron core 1 is fixed to the frame 4 in an optional position by means of methods such as shrinkage fit, press fit, molding, etc.

Paying attention to the fact that the hole of the frame 4 is in many cases inferior in roundness to an external form of the stator iron core 1 as described above, the invention takes notice of usefulness in controlling the positional relationship in the direction of rotation in a fixing process, in which the frame 4 and the stator iron core 1 are fixed together in the manufacturing process.

For example, in the case where a stator iron core is fixed to a frame by means of shrinkage fit, the stator iron core in a normal temperature state is conformed to the frame, which is expanded in shape, and left at normal temperature, and in the meantime the frame is contracted in shape to clamp the stator iron core, at which stress is applied to a maximum-diameter side of the stator iron core by the frame. That is, for the frame 4, of which a hole has an elliptical-shaped cross section, and the stator iron core 1 having a substantially circular-shaped cross section, the frame 4 and the stator iron core 1 contact with each other in a direction along the minor axis of the elliptical shape in an initial stage of the fixing process.

Further, it can be generally said that the larger the thickness of the frame, the larger the shape deformation at the time of expansion and shrinkage, and the larger the thickness of the frame, the larger a force applied directly on an outermost diameter portion of a side of the stator iron core by the frame. Accordingly, in fixation in such case, a location, in which stress of the stator iron core 1 becomes extreme (maximum in this case), corresponds to a location, in which the straight line 6 consistent with the minor axis intersects an outside diameter of the stator iron core 1. In the embodiment, the location, in which stress of the stator iron core 1 becomes extreme, is made nearest to the teeth 2 of the stator iron core 1. Here, since the teeth 2 is even in number, in order to realize the arrangement, it suffices that the straight line 6 corresponding with the minor axis be caused to be consistent with a teeth center line 7, which connects between the teeth 2 positioned at opposite poles of the stator iron core 1, or made nearest thereto.

While teeth center lines 7 corresponding in number to a half of the total number of teeth, that is, a plurality of teeth center lines can be set, the teeth center line 7 being positionally registered with the straight line 6 may be any one of the plurality of teeth center lines 7. After positioning in this manner, the both elements are fixed while the mutual positional relationship is maintained. Taking as an example fixation with shrinkage fit, the hole of the frame 4 and the external form of the stator iron core 1 are first measured along with the shapes thereof at an environmental temperature T0. Normally, measurement every frame and every stator iron core is not necessary provided that typical samples are measured.

Subsequently, the frame 4 is raised in temperature up to a specific temperature T1. T1 can be beforehand found through computational estimation as a temperature until the hole of the frame 4 is increased in diameter by thermal expansion to afford insertion of the stator iron core 1 into the hole provided that a material and a shape for the stator iron core 1 are given.

In this manner, the stator iron core 1 is inserted into the frame 4, which has been heated to temperature T1. Then the stator iron core 1 is rotated or the like to be positioned relative to the frame 4 so that the straight line 6 corresponding to the minor axis of the hole of the frame 4, which has been found, is made consistent with the teeth center line 7 of the stator iron core 1. After positioning in this manner, the frame 4 is cooled to normal temperature T0 to allow the stator iron core 1 to be fixed to the frame 4 through shrinkage at the time of cooling.

As described above, the straight line 6 corresponding to the minor axis of the frame 4 and the teeth center line 7 of the stator iron core 1 are positioned and fixed together whereby cogging torque is decreased as compared with the case where fixation is made in other locations. It is thought that the cause for this is that since the stator iron core 1 is larger in thickness by the teeth 2 than that in other locations to be large in mechanical strength, a region having an influence on a passage, through which magnetic flux passes inside the stator iron core 1, is small and hard to be influenced by stress when magnetic flux passes.

With a permanent-magnet type motor, assuming that a rotor and a stator, which include a magnet, take theoretical values, those times, in which cogging torque pulsates when a rotor makes a round, become those corresponding to a least common multiple of the number of poles of a magnet and the number of slots of a stator as shown on pages 2 to 4 of the Non-Patent Document 1. In actual products, however, there is occurred the number of pulsation smaller than a least common multiple of the number of poles of a magnet and the number of slots of a stator, which is typical in pulsating components being the same in number as the number of slots of a stator, and integral times thereof, or as the number of poles of a magnet and integral times thereof.

Among these, the formula (19) on page 4 of the Non-Patent Document 1 shows that one of occurrence conditions for pulsating components of cogging torque, which are the same in number as the number of poles of a magnet, is the case where the permeance distribution function formed by a stator has those pulsating components of N times every revolution of a rotor, which has a predetermined condition, and further shows the N predetermined conditions. That is, pulsating components of permeance formed by a stator side constitute one of causes for generation of pulsating components of cogging torque, which are the same in number as the number of poles of a magnet. In case of 8 poles and 12 slots, N=4 is in the stator iron core and N=4 as higher-order components created by N=2 also makes a cause for lower-order pulsating components.

Mechanism for occurrence of influences on cogging torque as a result of application of a force on a stator iron core from a frame at the time of fixation of the frame are roughly classified into two. One of them is a problem with deformation of an iron core. That is, when a force propagates inside the iron core, it is problematic how positions of teeth tip ends and open widths (these have an influence on air gaps for passage of magnetic flux) are varied as compared with those before being fixed to the frame and what nonuniform distribution they have as seen every tooth when the frame and the iron core balance in a final state with respect to stiffness (hardness or the like).

The second one of them is that energy, which cannot be finally deformed and is left as residual stress inside the iron core, partially changes the magnetic property (easiness, with which magnetic flux passes, magnetic permeability) of the iron core, and consequently how a manner, in which magnetic flux passes, is changed and what nonuniform distribution is generated.

For these changes, structural analysis enables computing of a state of final deformation and a state, in which residual stress is distributed. In particular, the distribution of residual stress makes a cue to know how a passage, through which magnetic flux passes, is varied, and in what region such change comes out, as seen every tooth.

As an example, structural analysis was made in the case where a completely circular stator iron core was shrinkage fitted into a frame, which is circular in inside diameter and elliptical in outside diameter, with the result that residual stress became larger in amplitude of double-symmetrical pulsation with the case where a maximum point of stress was made consistent with a slot center, than with the case where a maximum point of stress was made consistent with a teeth center. It is thought that since residual stress changes the magnetic property of flat rolled magnetic steel sheets and strip, the magnetic property of flat rolled magnetic steel sheets and strip also becomes in amplitude of double-symmetrical pulsation and cogging torque having lower-order pulsating components is increased. That is, in order to decrease cogging torque having lower-order pulsating components, it is thought that making a maximum point of stress consistent with a teeth center is more effective than making a maximum point of stress consistent with a slot center.

However, instead of positioning the maximum point of stress nearest to the teeth 2, it is also in some cases effective to position the point nearest to a center of the slot 3. That is, a slot center line 8 connecting between centers of slots 3 positioned at opposite poles is made consistent with the straight line 6. The effect of decreasing cogging torque is recognized in this case except the case where positioning is made on the basis of the teeth center line 7. Since in this position, the stator iron core 1 is smaller in thickness than in other locations but an improvement in cogging torque is recognized, that direction, in which stress is applied, is not radial on the circular-shaped cross section of the stator iron core 1 but angular relative to the radial direction, and residual stress itself is dispersed to become small in amplitude, which appears to be effective in decreasing cogging torque, as shown in the structural analysis.

This is because cogging torque finally appears not only as a change in magnetic property caused by the residual stress but also as a result of a combination of this change with flows of magnetic flux when an actual motor operation is performed, and it is thought that with which of a teeth center and a slot center the maximum point of stress should be optimally made consistent is changed according to conditions such as a detailed shape of a stator iron core, direction of magnetization of a permanent magnet on a rotor side, magnitude of magnetic flux, etc., so that it is desirable to make use of structural analysis to determine an optimum position as shown in an embodiment 2.

Also, since it is thought that also in the case where a combination of the number of poles and the number of slots is different from that in the present embodiment, pulsating components appearing in cogging torque change depending upon whether stress applied on a stator iron core from a frame is applied on a side of a slot of the stator iron core or a side of teeth, it is necessary to make constant a manner, in which stress is applied on the stator iron core from the frame, in order to suppress dispersion in cogging torque. Therefore, it is necessary to take notice of a point, at which stress applied on the stator iron core from the frame is maximum or minimum, to position a teeth center and a slot center of the stator iron core relative to the point.

In this manner, cogging torque in the both cases is decreased as compared with the case where fixation is made in other positions, and further provided that the frame 4 and the stator iron core 1 are fixed together in a controlled state, in which the constant positional relationship is maintained in this manner, cogging torque is made uniform in magnitude as far as the same type of device is associated. Since a method of controlling such mutual fixed positional relationship constant is not conventionally adopted, cogging torque in conventional products involves a large dispersion in magnitude and an increase in an average statistical center value of the cogging torque and products are reduced in yield in the case where magnitude of cogging torque is made an index of product control. According to the invention, dispersion in magnitude of cogging torque is improved and products are enhanced in yield conjointly with the effect of reduction in cogging torque.

Such effect is obtained only by simple positioning and fixation and does not need that complex manufacturing process, in which fins disclosed in Patent Document 3 is manufactured, so that it can simplify the manufacturing process to be also effective in reduction in cost. Also, according to the invention disclosed in Patent Document 3, a frame is much reduced in effective thickness and involves a fear in mechanical strength, but the present invention involves less reduction in effective thickness and is excellent in this respect.

EMBODIMENT 2

Figure 2:
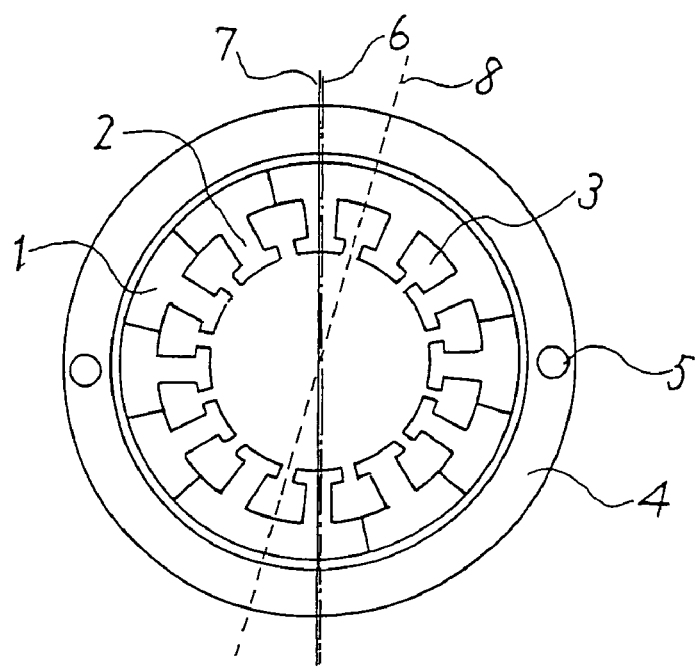
FIG. 2 is a view showing a cross section of a permanent-magnet type synchronous motor perpendicular to an axial direction of a stator, according to an embodiment 2 of the invention.

FIG. 2 shows a method of assembling a motor in the embodiment 2 of the invention, and the same circular frame as that in the embodiment 1 is taken as an example in the figure. The reference numerals are the same as those in FIG. 1.

In the embodiment 2, there is illustrated the case where a position of a maximum point of stress applied on a stator iron core 1 from a frame 4 is not clear from shapes thereof. Stated taking, for example, shrinkage fit as an example, a hole of the frame 4 and an external form of the stator iron core 1 are both elliptical, and it is not clear which location of the stator iron core 1 comes first into contact with the frame in the case where the frame 4 is cooled. Accordingly, the maximum point of stress is not clear.

In order to determine a position of a maximum point of stress in such case, it suffices to make use of, for example, a structural analysis program to determine a distribution of stress applied on the stator iron core 1 from the frame 4.

When shape and material of the frame 4, shape and material of the stator iron core 1, conditions of mutual arrangement, and conditions of temperature are input, the structural analysis program can be used to calculate a distribution of stress applied on the stator iron core in case of fixation through, for example, shrinkage fit. A predetermined arrangement can be determined by finding an arrangement, in which a maximum value of stress comes to a position corresponding a teeth center line 7 or a slot center line 8 on the basis of results of the calculation with respect to conditions (specifically, for example, an angle of rotation is changed) of plural arrangements of the frame 4 and the stator iron core 1.

In addition, since stress is applied on a side of the stator iron core from the frame to propagate inside while being accompanied by strain with the final result that distribution and direction of residual stress are found in this method, it is in some cases preferred from the viewpoint of reduction in cogging torque that a maximum value of stress preferably come to other position on the basis of such information instead of having the maximum value coming to a neighborhood of teeth, or a neighborhood of a slot. This leads to judgment on the basis of a direction of stress and a thickness of the stator iron core 1 in the direction.

In addition, when positioning is made in a position once determined for the type of device to fix the frame 4 and the stator iron core 1 together, there is produced an effect of reduction in dispersion in addition to the effect of reduction in cogging torque as described in the embodiment 1. Accordingly, as compared with a conventional method of manufacturing a motor, in which fixation is made without positioning in a fixed positional relationship, an improvement in dispersion of magnitude of cogging torque and the effect of reduction in cogging torque are combined to enhance products in yield.

The above matter is likewise established even when an external form of the frame 4 is rectangular or otherwise, and the same effect can be obtained.

EMBODIMENT 3

Figure 3:
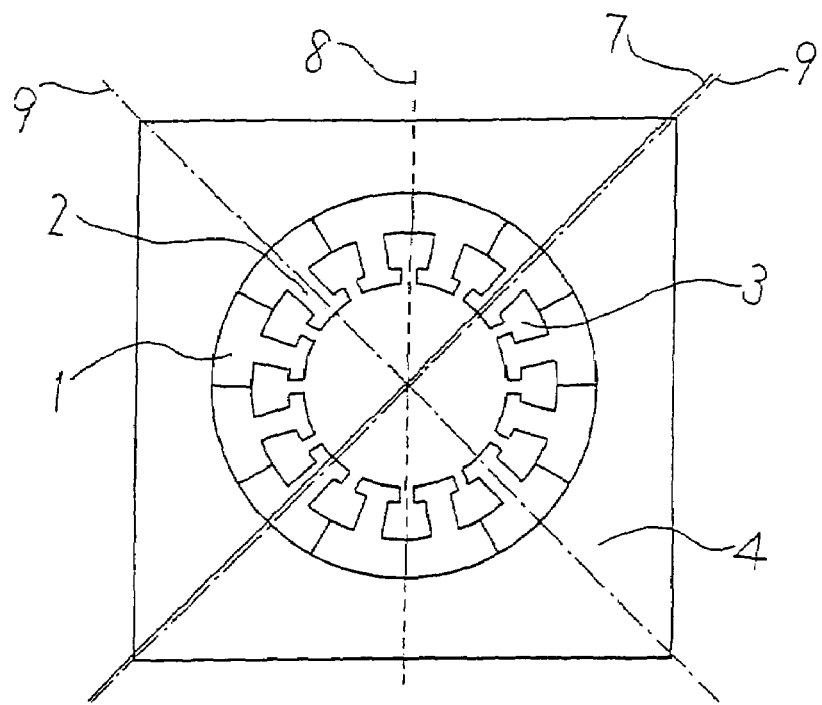
FIG. 3 is a view showing a cross section of a permanent-magnet type synchronous motor perpendicular to an axial direction of a stator, according to an embodiment 3 of the invention.

FIG. 3 is a view illustrating a method of assembling a motor in the embodiment 3 of the invention. The same reference numerals as those in FIG. 1 denote the same parts. A frame 4 is a square one, a hole of the frame 4 is substantially circular in cross section perpendicular to a rotating shaft of a rotor, and an external form of a stator iron core 1 is also substantially circular.

In such case, since the thickness of the frame 4 has a clear distribution in a circumferential direction, stress applied on a side of the stator iron core 1 from the frame 4 is dependent upon the thickness of the frame 4, and it is thought that the larger the thickness of the frame in a normal direction, the larger the stress applied on the side. That is, stress applied on the stator iron core 1 from the frame 4 is increased in a diagonal direction, in which the thickness of the frame 4 is increased as compared with the other case.

Accordingly, the effect of reduction in cogging torque like the effect described in the embodiment 1 can be obtained by making positioning so as to make a teeth center line 7 of the stator iron core 1 consistent with either of two diagonal lines 9 of the frame 4 in order to set the teeth center line to a maximum point of stress, and fixing the stator iron core 1 to the frame 4. Also, in the case where the thickness of the frame has a clear distribution in the normal direction and stress dependent upon the thickness is applied to the stator iron core 5 and in the case where the distribution is tetra-symmetrical relative to 360 degrees of a machine angle, the number of slots is 12, and the number of slots is divided by 4 being a symmetric property to result in 3 being odd, it is not necessarily necessary to take notice of only a point, at which stress becomes maximum, and even when taking notice of a point, at which stress becomes minimum, a slot center line of the stator iron core is made consistent with a side center line of the frame being a point, at which stress becomes minimum, it results that a teeth center is made consistent with a point, at which stress becomes maximum.

In this manner, it can be said that according to a shape of a frame and the number of slots it is unnecessary to take notice of only a point, at which stress becomes maximum, and it does not matter if a reference for positioning is determined taking notice of a point, at which stress becomes minimum. Details of the manufacturing method are the same as described in the embodiment 1 except the method of positioning.

In addition, while fixation of a frame and a stator iron core is made by means of shrinkage fit in the embodiments 1 to 3, such fixation may be made by means of press fit, or an adhesive, and the way of fixation is not particularly limitative.

Further, while the invention exemplifies a stator having 12 slots, the case with other pole slots will do, and there is no limitation thereon.

Besides, an external form of a frame having a circular-shaped or a square-shaped cross section is exemplified in the respective embodiments, a triangular or a pentagonal cross section will do, and there is no limitation in a shape of a frame.

EMBODIMENT 4

Figure 4:
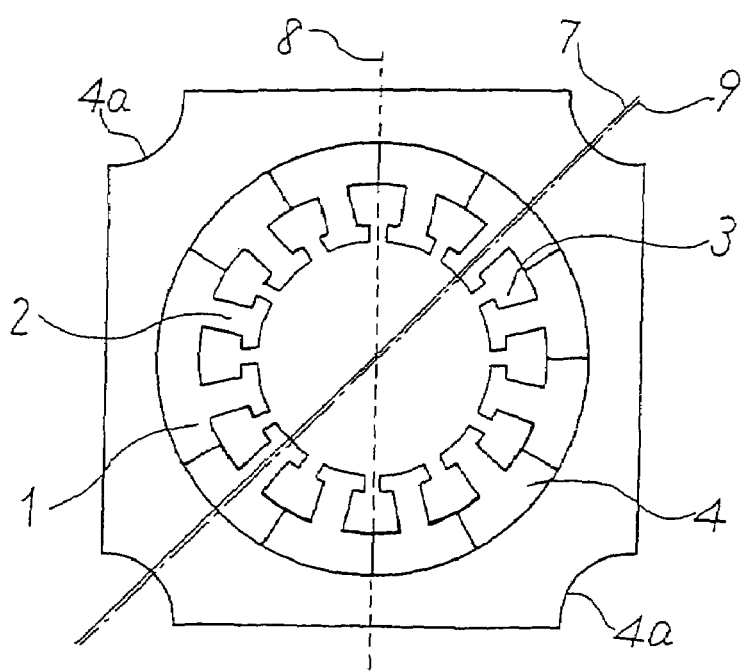
FIG. 4 is a view showing a cross section of a permanent-magnet type synchronous motor perpendicular to an axial direction of a stator, according to an embodiment 4 of the invention.

FIG. 4 is a view illustrating a method of assembling a motor in the embodiment 4 of the invention. The same reference numerals as those in FIG. 1 denote the same parts. A frame 4 is a substantially square one, and includes substantially circular notches 4a in diagonal directions. Also, although being not shown, a connector box or the like is in some cases mounted above the frame to have an influence on a thickness of the frame 4.

Figure 5:
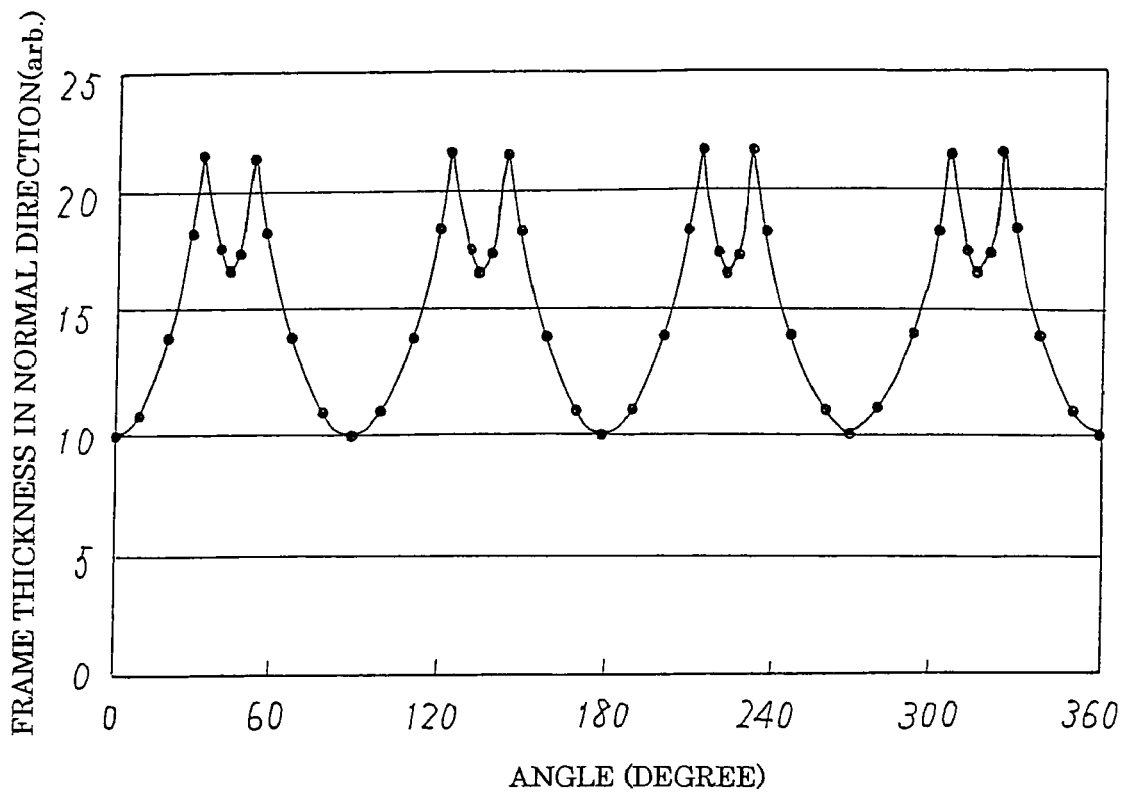
FIG. 5 shows a thickness distribution of a frame, in a normal direction, in the embodiment 4 of the invention.

In such case, since a thickness distribution of the frame 4 cannot be readily known, the angle dependence of frame thickness in a normal direction is found as shown in FIG. 5.

As a result, it is found that a region, which is thick in thickness distribution and in which stress applied on the stator iron core 1 from the frame 4 becomes maximum, is steep and a region, which is minimum in thickness distribution and in which stress applied on the stator iron core becomes minimum, is gentle in change.

As described above, since with the tetra-symmetrical frame, the number of slots is 12 and the number of slots is divided by 4 being a symmetric property to result in 3 being odd, the equivalent arrangement results even when positioning is made taking notice of a point, at which stress becomes minimum.

In particular, in the case where a point, at which stress becomes maximum, has a steep rate of change as in the frame configuration of the embodiment, a finite positioning accuracy is inevitably existent in view of the manufacturing process, so that positioning in that arrangement, in which the rate of change becomes minimum, is hard to be affected by an error in positioning at the time of volume production.

Hereupon, according to the embodiment, the stator iron core 1 and the frame 4 are positioned in a range of a positioning accuracy, for mass-produced motors, ±10 degrees centering on an angle, at which stress becomes minimum, and the frame 4 is fixed. By doing this, the effect of reduction in cogging torque like the effect described in the embodiment 1 can be obtained, in the case where the positioning accuracy is finite in view of the working process, positioning can be made in a state of being hard to be affected by the error, and it is possible to maintain cogging torque at a small value in volume production without dispersion.

EMBODIMENT 5

Figure 6:
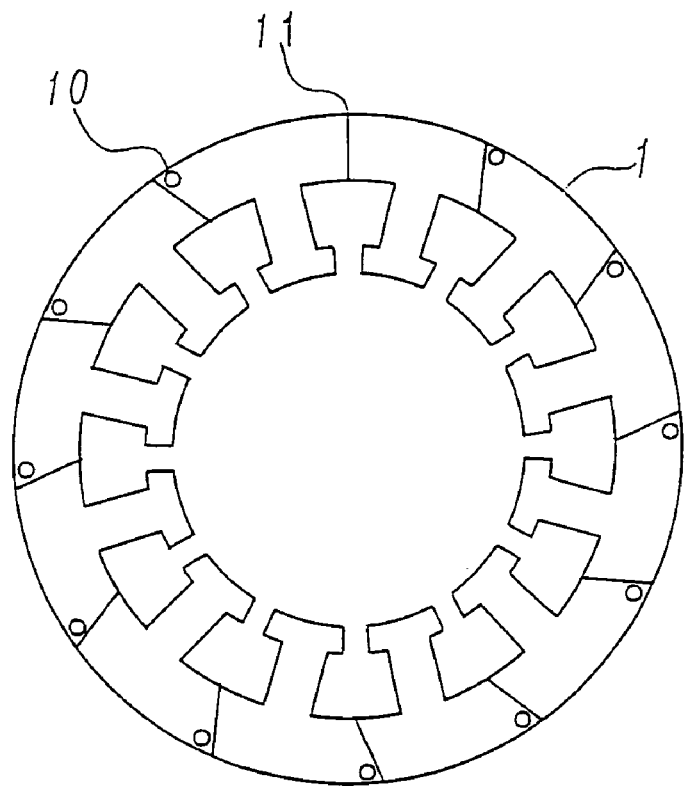
FIG. 6 is a view illustrating an articulation type iron core in the embodiment 5 of the invention.

In the embodiment, the same frame as that in the embodiment 4 is used but an articulation type iron core is adopted for a stator iron core. This is contrived so that instead of punching a substantially circular seamless iron core from flat rolled magnetic steel sheets and strip, one or more cuts are provided and bendable hinge mechanisms (articulations 10) are provided on slots as shown in FIG. 6 to make a stator iron core straight to easily perform winding in a process, in which winding is wound round teeth.

Figure 7:
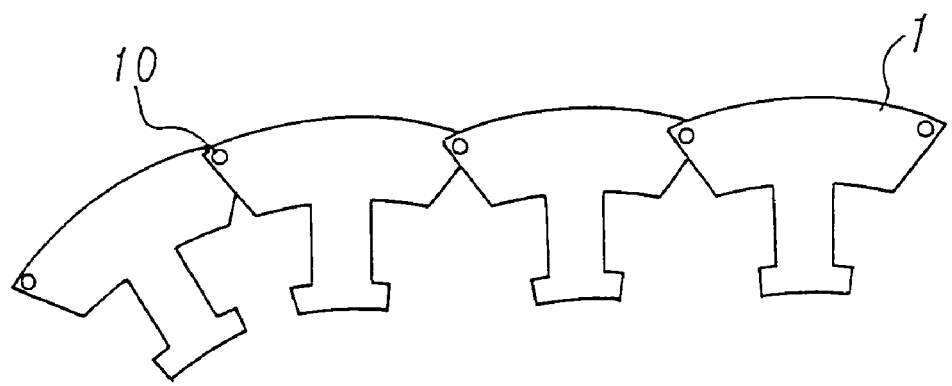
FIG. 7 is a view illustrating butt portions of the articulation type iron core in the embodiment 5 of the invention.

Since the stator iron core includes cuts, it is necessary to put the cuts together after winding to perform the connection work, such as welding, etc., on a side of the iron core. These portions are called butt portions. FIG. 7 is a schematic view showing the stator iron core to clarify the butt portions 11. The butt portions 11 of the iron core have different properties in structure and internal state from other slot portions such that residual stress at the time of welding is left. Therefore, in case of that articulation type iron core, in which the butt portions 11 are present, it is thought desirable that stress applied on the butt portions from the frame be small.

Hereupon, according to the invention, instead of a slot center line, a center line of the butt portion 11 is made a reference point of positioning, and a target point of positioning is set so that the butt portion 11 is conformed to an arrangement, in which stress applied on the stator iron core from the frame becomes surely minimum, that is, in which a thickness becomes minimum and its rate of change also becomes minimum in the thickness distribution in a normal direction of the frame. The positioning accuracy is equivalent to that in the embodiment 4 to be ±10 degrees.

Figure 8:
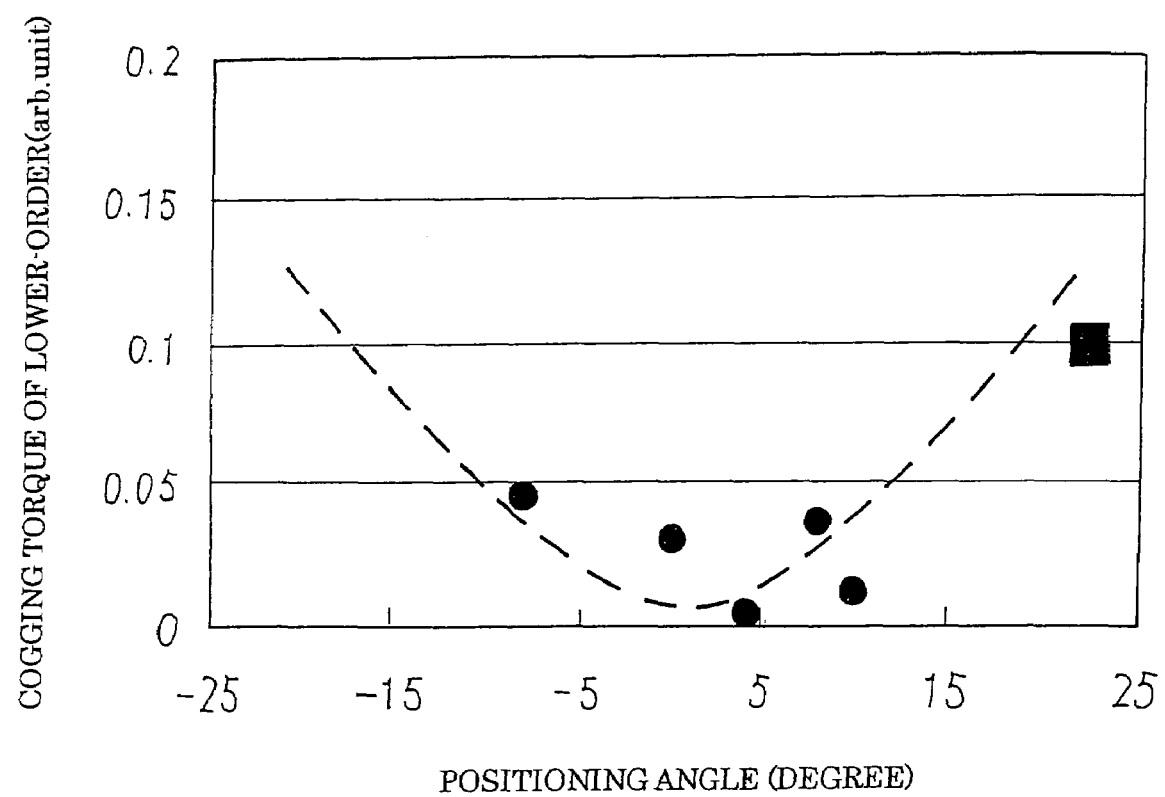
FIG. 8 shows results of actual measurement of lower-order components of cogging torque in the case where positioning is made in the butt portions of the articulation type iron core in the embodiment 5 of the invention and manufacture is carried out.

FIG. 8 shows a summary of results of actual measurement of lower-order components of cogging torque in the case where positioning is made as described above and manufacture is carried out. Even when an positioning angle is dispersed in a range of ±10 degrees, the components are encompassed in 0.05[arb.unit] or less, which is aimed at. In addition, a solid square indicates data in the case where a positioning angle is intentionally dispersed at 22 degrees. It is seen from the results of actual measurement that cogging torque is surely decreased in case of positioning as compared with the case where positioning is not made.

In this manner, even in the case where an articulation type iron core, in which the butt portions 11 are present, is used, the effect of reduction in cogging torque like the effect described in the embodiment 1 can be obtained by making positioning making the butt portion of the stator iron core consistent with a target point, in which stress applied on the stator iron core from the frame, that is, the thickness distribution in a normal direction of the frame becomes minimum and the rate of change of the thickness distribution becomes minimum, and in the case where the positioning accuracy is finite in view of the working process, positioning can be made in a state of being hard to be affected by the error, so that it is possible to maintain cogging torque at a small value in volume production without dispersion.

Also, it goes without saying that the present method is not limited to an articulation type iron core but can be used for a thin-wall connection type iron core of that type, in which connections of teeth are made from a thin wall.

EMBODIMENT 6

Figure 9:
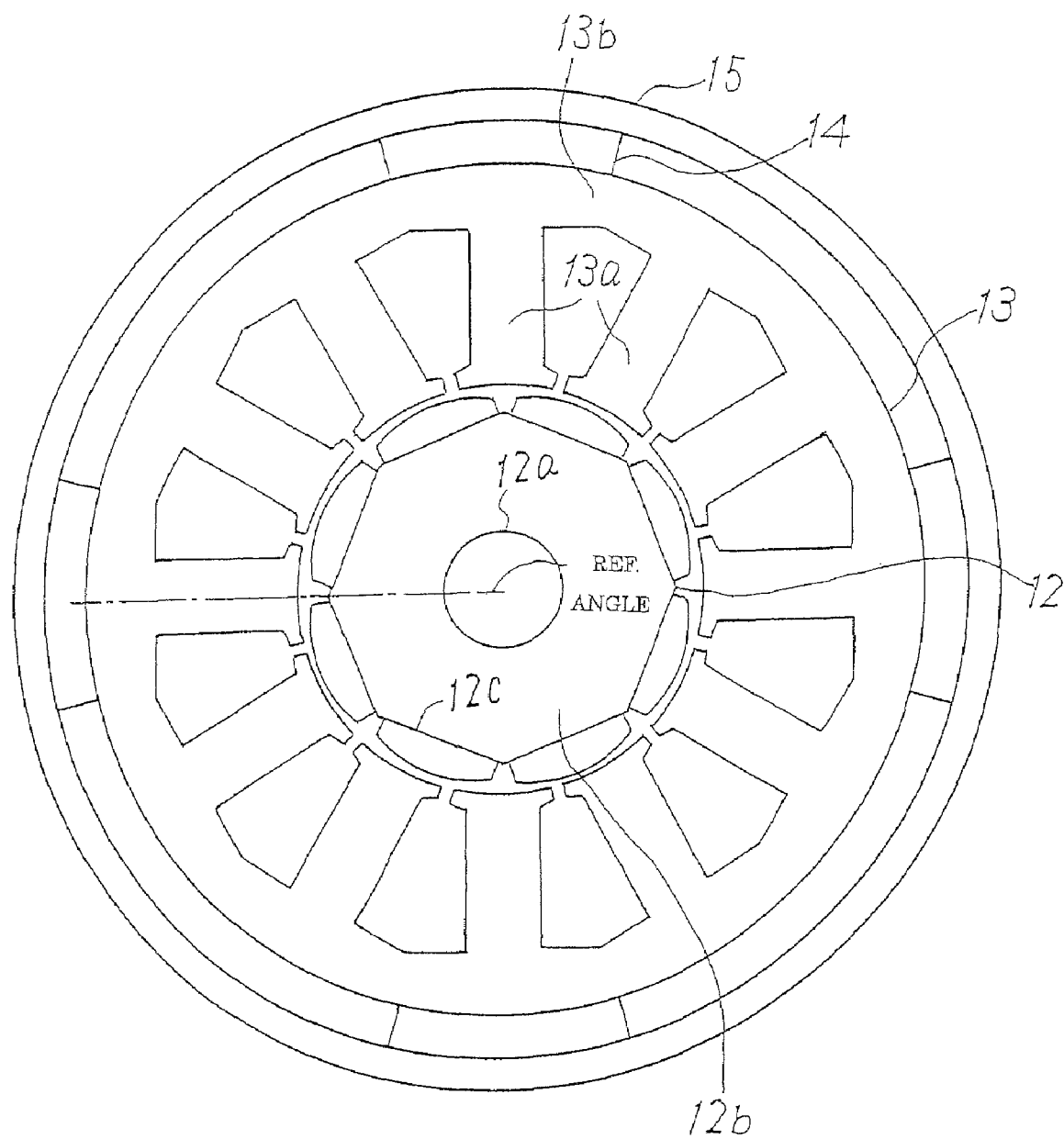
FIG. 9 is a view showing a cross section of a permanent-magnet type synchronous motor perpendicular to an axial direction of a stator, according to an embodiment 6 of the invention.

The embodiment 6 will be described with respect to a permanent-magnet type synchronous motor having 8 poles and 12 slots and capable of decreasing cogging torque by applying pressure in predetermined positions with a pressure part. FIG. 9 is a cross sectional view showing a permanent-magnet type synchronous motor according to the embodiment 6. In the embodiment, an explanation will be given to the case of 8 poles and 12 slots.

A rotor 12 comprises a shaft 12a, a rotor yoke 12b, and magnets 12c being permanent magnets. The shaft 12a secures thereto the rotor yoke 12b, which comprises a magnetic body being octagonal in external form, and the magnets 12c are fixed to respective flat portions of the octagonal external form of the rotor yoke 12b. Adjacent poles of the magnets 12c are configured to be opposite to each other. A stator iron core (stator core) 13 is mainly composed of teeth 13a and a back yoke 13b on a circular pipe, and an inner-ring side of the teeth 13a of the stator 13 and arcuate sides of the magnets 12c of the rotor 12 are arranged to define an air gap. In addition, a coil normally wound round the teeth 13a is omitted in FIG. 1.

Also, provided outside the stator 13 are pressurizing parts 14 that pressurize the stator 13 inward in predetermined positions on an outer periphery thereof, and an armour part 15 that pressurizes the pressurizing parts 14 inward at outer peripheries of the pressurizing parts 14. Also, although being not shown, the rotor 12 is rotatably supported, and the magnets 12c in the embodiment are ideally arranged to provide for a uniform and symmetrical magnetic flux density distribution. On the other hand, since the stator 13 includes nonuniform portions in terms of manufacture, pulsating components are contained in permeance. An influence, which is produced on a product by the pulsating components, will be described later.

Subsequently, an operation will be described. The rotor 12 and the stator 13 are assembled together, the rotor 12 is rotated at low and constant speed in a state, in which electric current is not caused to flow through a coil (not shown) around the teeth 13a, and torque required for rotation at that time is measured every angle. Such torque is called loss torque. The loss torque is composed of a specific portion typified by slide torque of bearings that rotatably support the rotor 12, and pulsating components according to a variation of the rotor 12 every angle in total magnetic energy of that magnetic circuit, which is formed by the rotor 12 and the stator 13. In addition, the pulsating components are called cogging torque.

Figure 10:
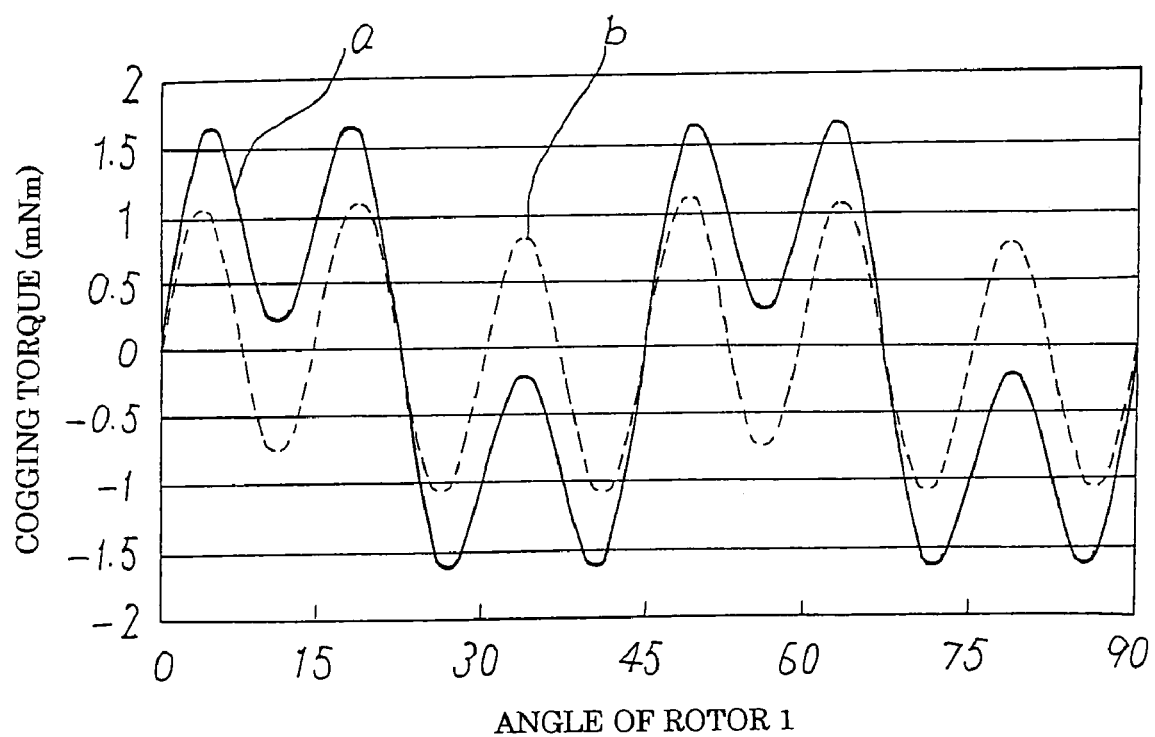
FIG. 10 shows an example of results of measurement of cogging torque at an angle of a rotor in the permanent-magnet type synchronous motor according to the embodiment 6 of the invention.

FIG. 10 shows an example of results of measurement of cogging torque at an angle of the rotor in a permanent-magnet type synchronous motor according to the embodiment 6. The angle of the rotor is shown to range from 0 to 90 degrees. In the figure, the axis of abscissas indicates a rotor angle and the axis of ordinate indicates cogging torque, a curve a being measured before the pressurizing parts 14 pressurize the stator 13 in predetermined positions on an outer periphery thereof at the time of manufacture. A reference of the rotor angle assumes 0 degree in the case where the angularly positional relationship of the rotor 12 and the stator 13 is put in a state of arrangement shown in FIG. 9. That is, in the case where the reference angle of the rotor 12 is intermediate between magnetic poles, a position of the reference angle of the rotor 12 and a center of the teeth 13a of the stator 13 are disposed on a straight line.

The curve a in FIG. 10 contains components obtained by superposition of pulsating components of 24 times and pulsating components of 8 times when the rotor 12 makes one revolution. Pulsating components of 24 times are known as pulsating components that can be generated even when the stator 14 and the rotor 12 assume theoretical shapes, since the rotor 12 is 8 in number of poles, the stator 13 is 12 in number of slots in the embodiment, and the pulsating components of 24 times is in agreement with 24, which is a least common multiple of 8 and 12. Pulsating components of 8 times are the same as the number of poles of the rotor 12.

As shown in the formula (19) on page 4 of the Non-Patent Document 1, it is indicated that the rotor 1 can generate cogging torque having pulsating components of 8 times (2 p) every revolution in the case where the permeance distribution function formed by the stator has those pulsating components of N times every revolution of the rotor 12. It is indicated that N meets any one of the following formulae $$N=p \tag{1}$$

or $$N=\pm 2p - i1 \times Z \tag{2}$$

or $$N=i1 \times Z \pm 2p \tag{3}$$

where p indicates pole logarithm assuming a value of a half of the number of poles, Z indicates the number of slots, and i1 indicates spatial orders when the permeance distribution function is expanded in Fourier series.

Since an order i1 having a largest influence is 1, it does not matter if i1=1. In the case where it is applied to a permanent-magnet type synchronous motor having 8 poles and 12 slots in the embodiment 6, a minimum numeral among solutions of N is 4. N=4 is obtained from p=4, and when i1=1, Z=12, and p=4, N=1×12−8=4 results. The smaller the solution of N, the more liable it appears as cogging torque. That is, the fact that cogging torque has pulsating components of 8 times (8 times in a plus direction and 8 times in a minus direction) per one revolution of the rotor 12 indicates a possibility that pulsating components of N=4 times are contained in the permeance distribution function of the stator 13 since the stator 13 is nonuniform in terms of manufacture.

However, the cause for this lists anisotropy, in magnetic permeability, of a steel sheet used for the stator 13, local residual stress generated by the working at the time of manufacture, stress due to press fitting of the stator 13, etc. as well as the shape of the stator 13, and it is difficult to specify and remove these causes in terms of manufacture. In order to decrease cogging torque having pulsating components of 8 times per one revolution of the rotor 12, it is considered as effective means to conversely give components having an opposite phase to that of pulsating components of 4 times in the permeance distribution function formed by the stator 13 and to cancel pulsating components of 4 times in the permeance distribution function.

Here, in the case where pulsating components of 8 times contained in cogging torque present a waveform of a phase of a shown in FIG. 10, predetermined stress and displacement are imparted to the stator 13 by preparing four pressurizing parts 14 corresponding to pulsating components of 4 times contained in the permeance distribution function of the stator 13 as shown in FIG. 9, and press fitting the parts in four locations at intervals of 90 degrees from a center of teeth disposed on a straight line passing through a position of the reference angle between the armour part 15 and the stator 13. The stress changes the stator 13 locally in relative permeability. A change, in relative permeability, caused by displacement and stress of the stator 13 results in pulsating components of 4 times per one revolution of the rotor 12 as an air gap length between the stator 13 and the rotor 12, and relative permeability also results in pulsating components of 4 times per one revolution of the rotor 12 due to stress of the back yoke 13b of the stator 13. Therefore, components having an opposite phase to that of pulsating components of 4 times in the permeance distribution function are given to enable canceling pulsating components of 4 times in the permeance distribution function of the stator 13.

A curve b in FIG. 10 represents cogging torque measured after the stator 13 is press fitted into the pressurizing parts 14 with an appropriate interference. It is found that as compared with the curve a, pulsating components of 8 times contained in cogging torque per one revolution are cancelled and cogging torque is generally decreased.

Also, in the case where pulsating components of 8 times contained in cogging torque are offset a degrees from the phase of the curve a in FIG. 10, it can be accommodated by rotating positions of pressurization correspondingly. While a quantity, by which positions of pressurization are to be made offset, generally tends to be in proportion to a degrees, proportioning does not occur occasionally since the tendency is dependent upon the degree of interference in case of press fit. Accordingly, it is desirable to experimentarily grasp the quantity according to conditions of individual products.

The number of locations of pressurization is determined by a plus value of a solution of N found by N=p, N=±2×p−Z, or N=Z±2×p where i1=1 in the formulae (1) to (3), and positions of pressurization are determined such that a point, at which cogging torque is zero in measurement of cogging torque, or a neighborhood thereof makes a first position of pressurization, the first position of pressurization is made a reference angle in FIG. 9, and the remaining positions of pressurization are arranged at equal angular intervals.

As described above, since the embodiment comprises the stator 13 having 12 slots, on which a coil is arranged, the rotor 12 having permanent magnets of 8 poles and inserted into a torus of the stator 13, and the pressurizing parts 14 that pressurize an outer periphery of the stator 13 inward in N locations, N being a plus minimum value of 4 calculated from N=4, N=±2×4−12, or N=12±2×4, stress and displacement by the stress are imparted to the stator 13 in predetermined locations to cancel pulsating components of 4 times, in permeance, formed by the stator 13, thereby enabling decreasing cogging torque having pulsating components of the same number as the number of poles of the rotor 12.

In addition, while the embodiment adopts a construction, in which the arcuate-shaped pressurizing parts 14 are arranged between the stator 13 and the armour part 15, a construction, in which stress can be applied to an inside of an outer periphery of the stator 13 in four predetermined locations, suffices, so that in case of application to, for example, products of volume production, stress can be applied inside in predetermined locations by contriving a molding direction and a shape of a mold as by increasing an outside thickness at the time of molding an armour in the case where predetermined locations of stress application are substantially the same every product.

Also, according to the embodiment, a ratio of the number of poles of the rotor 12 to the number of slots of the stator 13 is 2:3, and typical examples of the ratio of the same number as that include 4 poles and 6 slots, and 6 poles and 9 slots. A minimum among those solutions of N associated with pulsating components of N times in the permeance distribution function of the stator 13, which possibly generate pulsating components, in cogging torque, of the same number as the number of poles of the rotor, is N=2 in case of 4 poles and 6 slots and N=3 in case of 6 poles and 9 slots. These produce the same effect provided that the pressurizing parts 14 of corresponding numbers, respectively, are arranged since slots of the stator 13 and poles of the rotor 12 are quite the same in angular relationship when an angle of the rotor 12 is regarded as electrical angle. In addition, while according to the embodiment N assumes a plus minimum value among values found by N=p, N=±2×p−Z, or N=Z±2×p, N is not limited to the minimum value but may assume any one of plus values.

EMBODIMENT 7

The embodiment 7 will be described with respect to a permanent-magnet type synchronous motor having 10 poles and 12 slots and capable of decreasing cogging torque by applying pressure in predetermined positions with a pressurizing part.

Figure 11:
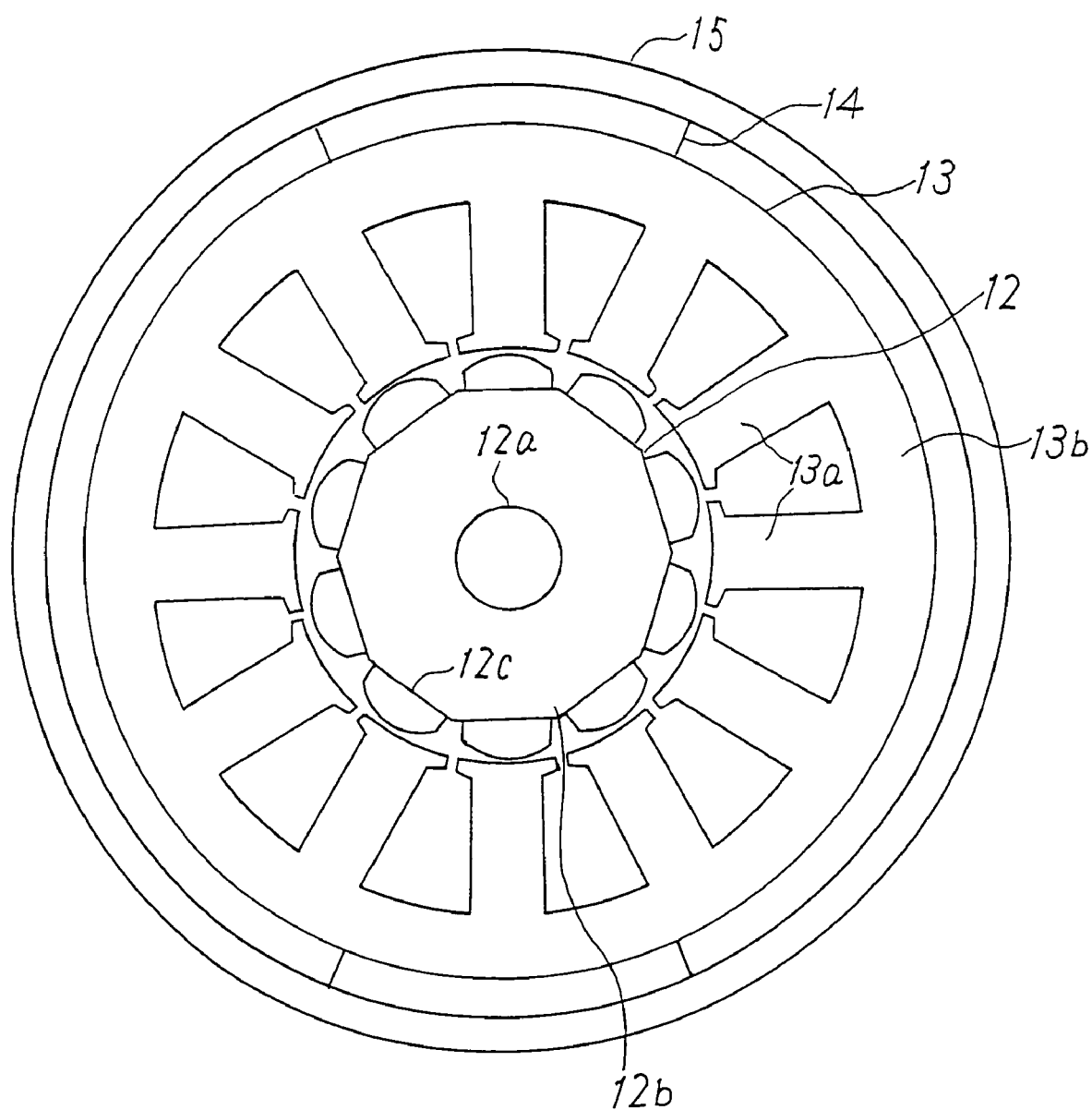
FIG. 11 is a view showing a cross section perpendicular to an axial direction of a permanent-magnet type synchronous motor according to an embodiment 7 of the invention.

FIG. 11 is a cross sectional view showing a permanent-magnet type synchronous motor according to the embodiment 7. In contrast to the embodiment 6, a rotor has 10 poles and a stator has 12 slots in the present embodiment. However, while the pressurizing parts 14 are arranged in four locations in the embodiment 6, they are arranged only in two locations in the present embodiment.

Also, magnets 12c in the embodiment are ideally arranged to provide for a uniform and symmetrical magnetic flux density distribution on the other hand, since the stator 13 includes nonuniform portions in terms of manufacture, pulsating components are contained in permeance. An influence, which is produced on a product by the pulsating components, will be described later.

Figure 12:
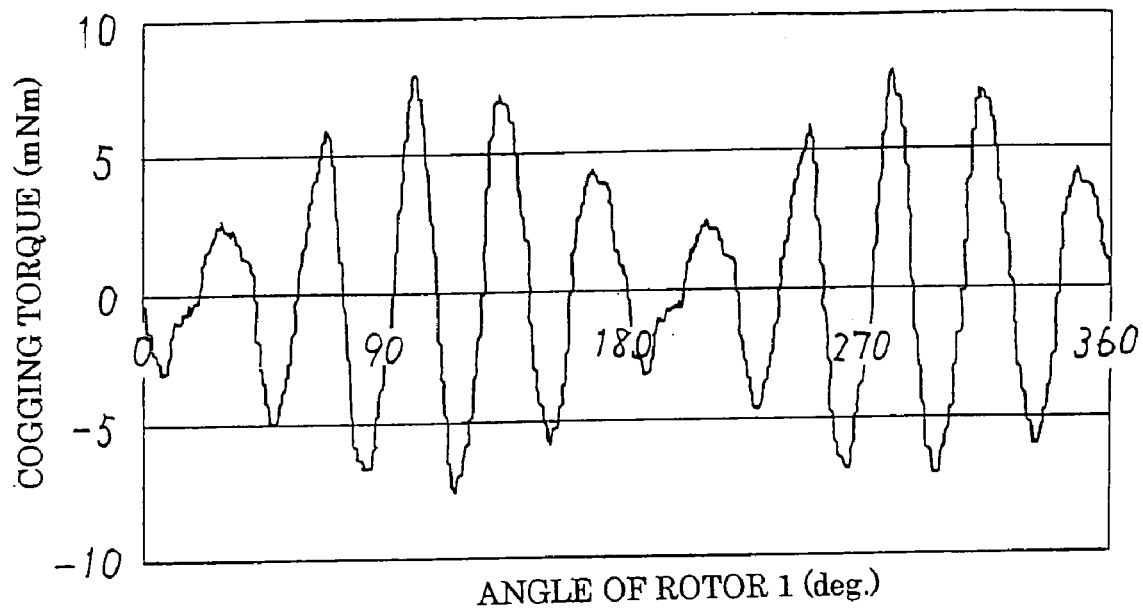
FIG. 12 shows an example of results of measurement of cogging torque at an angle of a rotor in the permanent-magnet type synchronous motor according to the embodiment 7 of the invention.
Figure 12:
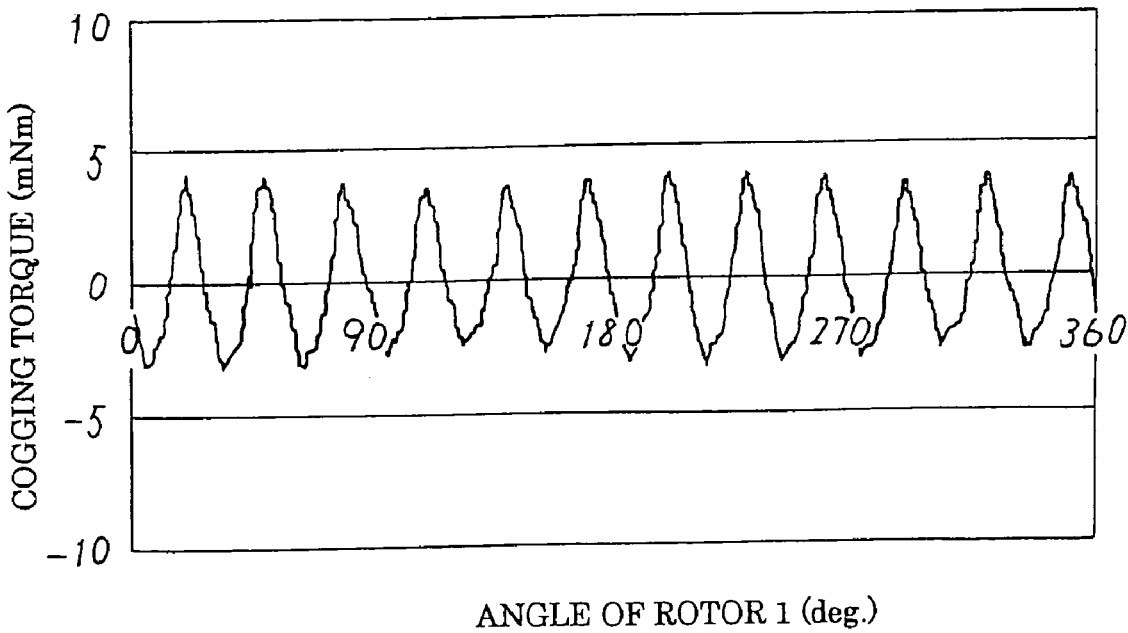

FIG. 12 shows an example of results of measurement of cogging torque at an angle of the rotor 12 in a permanent-magnet type synchronous motor according to the embodiment 7. The angle of the rotor is shown to range from 0 to 360 degrees. FIG. 12(a) shows measurement before the pressurizing parts 3 pressurize the stator 13 in predetermined positions on an outer periphery thereof at the time of manufacture.

Cogging torque in FIG. 12(a) contains components obtained by superposition of pulsating components of 12 times equal to the number of slots of the stator 13 and pulsating components of 10 times equal to the number of poles of the rotor 12 when the rotor 12 makes one revolution. With respect to pulsating components of 10 times equal to the number of poles of the rotor 12, in the same manner as the theory shown in the embodiment 6, conditions of N associated with pulsating components of N times in the permeance distribution function formed by the stator, which possibly generate cogging torque having pulsating components of 10 (2 p) times per one revolution of the rotor 12, are any one that meets N=p, or N=±2 p−i1×Z, or N=i1×Z±2 p. Therefore, a minimum numeral among solutions of N becomes 2 in case of application to a permanent-magnet type synchronous motor having 10 poles and 12 slots, according to the embodiment 7. It is a case of i1=1, Z=12, and 2 p=10, in which N=1×12−10.

That is, the fact that cogging torque has pulsating components of 10 times (10 times in a plus direction and 10 times in a minus direction) per one revolution of the rotor 12 indicates a possibility that pulsating components of 2 times are contained in the permeance distribution function of the stator 13 since the stator 13 is nonuniform in terms of manufacture. As described in the embodiment 6, the cause for this lists anisotropy, in magnetic permeability, of a steel sheet, local residual stress generated by the working at the time of manufacture, stress due to press fitting of the stator 13, etc., in addition to the shape of the stator 13.

In particular, for pulsating components of 2 times contained in the permeance distribution function, after going through the rolling process in manufacture of steel sheet when the steel sheet itself used for the stator 13 is manufactured, residual internal stress is different in a direction of rolling and a direction perpendicular thereto, so that the steel sheet becomes anisotropic in relative permeability. In the case where cores punched from the steel sheet are stacked while being tuned up in direction to form the stator 13, the relative permeability of the back yoke 13b of the stator 13 will have pulsating components of 2 times per one revolution of the rotor 12. In order to decrease pulsating components of 10 times per one revolution of the rotor 12, it suffices to conversely give components an opposite phase to that of pulsating components of 2 times in the permeance distribution function formed by the stator 13.

Here, in the case where pulsating components of 8 times contained in cogging torque present a waveform having a phase as in the curve a in FIG. 2, predetermined stress and displacement are given to the stator 13 by preparing two pressurizing parts 3 equal to pulsating components of 2 times in the permeance distribution function of the stator 13 as shown in FIG. 11 to press fit the same in an opposite position between the armour part 15 and the stator 13. The stress changes the stator 13 locally in relative permeability. A change, in relative permeability, caused by displacement and stress of the stator 13 results in pulsations of 2 times per one revolution of the rotor 12 as an air gap length between the stator 13 and the rotor 12, and relative permeability also results in pulsations of 2 times per one revolution of the rotor 12 due to stress of the back yoke 13b of the stator 13. Therefore, when the positional relationship of the rotor 12 and the stator 13 is put in order, the permeance distribution function also gives components having an opposite phase to that of pulsating components of 2 times.

FIG. 12(b) shows cogging torque measured after the pressurizing parts 14 are press fitted onto the stator 13 with an appropriate interference. As compared with FIG. 12(a), it is found that pulsating components of 10 times contained in cogging torque per one revolution are canceled, and cogging torque is generally decreased.

As described above, since the embodiment comprises the stator 13 having 12 slots, on which a coil is arranged, the rotor 12 having permanent magnets 12c of 10 poles and inserted into a torus of the stator 13, and the pressurizing parts 14 that pressurize an outer periphery of the stator 13 inward in N locations, N being a plus minimum value of 2 calculated from N=5, N=±2×5−12, or N=12±2×5, stress and displacement by the stress are imparted to the stator 13 in predetermined locations to cancel pulsating components of 2 times, in permeance, formed by the stator 13, thereby enabling decreasing cogging torque having pulsating components of the same number as the number of poles of the rotor 12.

EMBODIMENT 8

Figure 13:
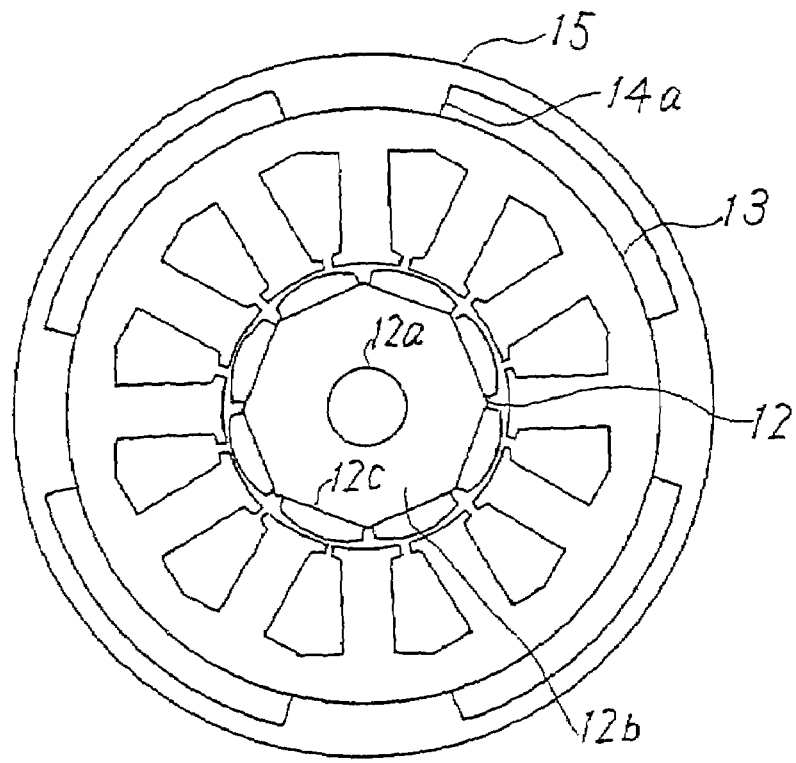
FIG. 13 is a view showing a cross section perpendicular to an axial direction of a permanent-magnet type synchronous motor according to an embodiment 8 of the invention.
Figure 14:
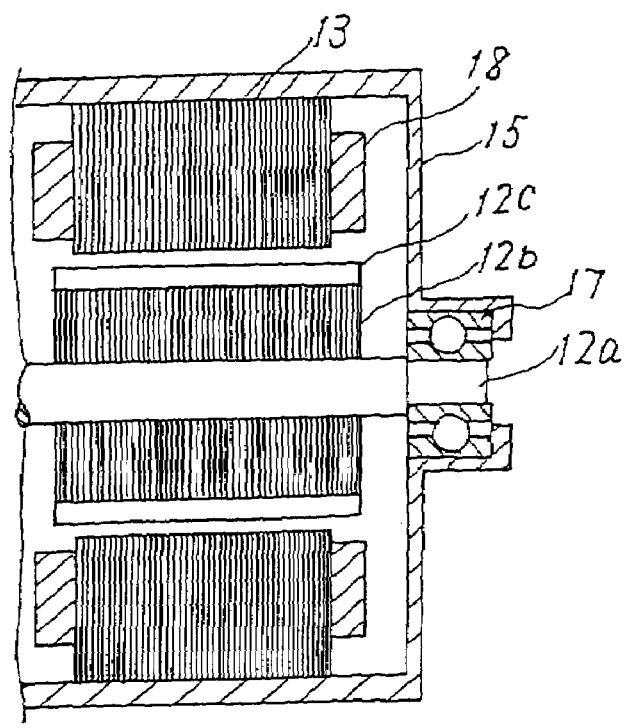
FIG. 14 is a transverse, cross sectional view showing a permanent-magnet type synchronous motor according to the embodiment 8 of the invention.

FIG. 13 is a cross sectional view showing the embodiment 8 of a permanent-magnet type synchronous motor according to the invention. The embodiment is different from the embodiment 6 in that in place of the pressurizing parts 14 and the armour part 15, a stator 13 is press fitted into a frame 5. Also, FIG. 14 is a transverse, cross sectional view showing a permanent-magnet type synchronous motor according to the embodiment 8. The frame 15 comprises pressurizing portions 14a that pressurize the stator 13 in four predetermined locations, and bearing portions 14b that support outer rings of bearings 17 fitted onto a rotor 12 so as to support ends of the rotor 12 to enable the rotor to rotate. In a constructional view, the bearing portions 14b and the pressurizing portions 14a of the frame 15 are provided on the same axis.

At the time of manufacture, the stator 13 is press fitted into the frame 15 such that the pressurizing portions 14a of the frame 15 are made in agreement with predetermined locations on an outer periphery of the stator 13. Then the frame 15 pressurizes the stator 13 inward in the predetermined locations on the outer periphery thereof. Therefore, by giving the same action as that of the pressurizing portions 14 in the embodiment 6, it is possible to decrease cogging torque. Accordingly, parts can be simplified because of a construction, in which the frame 15 can directly pressurize the stator 13 inward in the predetermined locations on the outer periphery thereof in addition to enabling the embodiment 8 to produce the same effect as that in the embodiment 6.

In addition, while the embodiment has been described with respect to the case where press fit is performed as means, by which the frame 15 secures and pressurizes the stator 13, shrinkage fit may be performed as such means.

Also, while the embodiment has been described with respect to the case of 8 poles and 12 slots, the same effect can be produced provided that pressurizing portions of the frame 15 are provided in two locations in the case of 10 poles and 12 slots in the embodiment 7.

EMBODIMENT 9

The embodiment 9 will be described with respect to a manufacturing method, in which it is possible to decrease cogging torque in a permanent-magnet type synchronous motor according to the invention.

Generally, in order to stabilize quality at the time of manufacture of permanent-magnet type synchronous motors, examination of cogging torque is commonly made at the time of manufacture. However, the process of examination of cogging torque is performed in a stage of final examination of finished products after all elements are assembled. Therefore, in the case where a small cogging torque is demanded according to specifications of products, those products generated at the time of manufacture not to meet the specifications are disposed of, or disassembled for readjustment, or the like. Also, in case of permanent-magnet type synchronous motors, which need the process of press fit of an external form of a stator 13, the process of press fit rather increases cogging torque in some cases.

The embodiment is described with respect to the case of 8 poles and 12 slots in the embodiment 6. First, cogging torque is measured by setting the rotor 12 and the stator 13 to positions after assembly in a stage, in which the stator 13 is pressurized by the pressurizing portions 14. At this time, it is desirable to perform measurement in a state, in which a coil 18 is wound. This is because tension in the coil 18 at the time of winding generates in some cases stress on teeth of the stator 13 or the like.

In addition, in the case where cogging torque at the time of measurement in manufacture is substantially constant in phase every product in products of volume production, it is not necessary to perform examination every product but measurement may be made in examination without notice.

Subsequently, the number N of locations, in which the stator 13 is pressurized, is determined from data of cogging torque of the rotor 12 every angle. In the case where pulsating components of 8 times being the same number as the number of poles of the rotor 12 are detected from data of cogging torque, there is a possibility that the permeance distribution function formed by the stator has pulsating components of N times every revolution of the rotor 12, on the basis of the formula (19) on page 4 of the Non-Patent Document 1. It is indicated that N is any one that meets N=p, or N=±2 p−i1×Z, or N=i1×Z±2 p where p indicates pole logarithm assuming a value of a half of the number of poles, Z indicates the number of slots, and i1 indicates spatial orders when the permeance distribution function is expanded in Fourier series.

A plus minimum numeral among solutions of N becomes 4 as shown in the embodiment 6. Therefore, in order to decrease cogging torque having pulsating components of 8 times per one revolution of the rotor 12, it is necessary to conversely give components having an opposite phase to that of pulsating components of 4 times in the permeance distribution function formed by the stator 13, so that N is determined to be 4.

Subsequently, those locations, in which the stator 2 is pressurized, is determined from data of cogging torque of the rotor 12 every angle. Specifically, components of the same number as the number of poles of the rotor 12 are extracted from data of cogging torque, and those locations, in which the stator 13 is pressurized, is determined according to a phase of substantially sine wave components thus extracted. For example, in the case where cogging torque is like the curve a in FIG. 10 in the embodiment 6, the locations of pressurization are four in number at intervals of 90 degrees from a center of teeth disposed on a straight line passing through a position of the reference angle shown in FIG. 9.

Also, in the case where pulsating components of 8 times contained in cogging torque are offset α degrees from the phase of the curve a in FIG. 10, it is desirable to experimentarily grasp such locations as shown in the embodiment 6, so that it is necessary to beforehand make mapping taking account of conditions such as interference, etc. to take out information from the map at the time of production to determine locations corresponding to those locations, in which the stator 13 is pressurized.

Finally, pressurization is applied in predetermined locations on the outer periphery of the stator 13. The pressurizing portions 14 are made in agreement with the four predetermined locations on the outer periphery of the stator 13 to be press fitted between the armour part 15 and the stator.

Accordingly, the embodiment 9 has a feature comprising the step of inserting and assembling the rotor 12 having permanent magnets of 8 poles (P is a natural number) into the stator 13 formed to be torus-shape and having 12 slots, on which a coil is arranged, the step of rotating the rotor 12 in a state, in which electric current is not caused to flow through a coil of the stator 13, to measure cogging torque every angle, the step of determining those locations, in which the outer periphery of the stator 13 is pressurized, on the basis of measurements of cogging torque, and the step of assembling the pressurizing parts, which pressurize the outer periphery of the stator, to an outside of the stator in four locations, four being a plus minimum value calculated from N=4, N=±2×4−12, or N=12±2×4.

Thereby, since a state of cogging torque before the outer periphery of the stator 13 is pressurized in predetermined locations is made use of, the cause for generation of cogging torque can be dealt with as a black box and components caused by non-uniformity of cogging torque every slot can be decreased in case of whatever cause, so that it is possible to decrease cogging without investigating the cause for cogging torque.

In addition, in the case where cogging torque of the same number as the number of poles of the rotor 12 is not generated in the step of measuring cogging torque, a part in the form of an ordinary circular pipe for fixation of the stator 13 may be used to fix the stator 13 without the use of the pressurizing portions 14 having a structure for pressurization and the frame 15. Also, the manufacturing method according to the embodiment can be likewise used for the frame 15 according to the embodiment 8.

EMBODIMENT 10

The embodiment 10 will be described with respect to a permanent-magnet type synchronous motor capable of decreasing cogging torque in the case where the number of locations, in which a stator is pressurized by a pressurizing part, is not a minimum numeral among solutions of the condition N.

Figure 15:
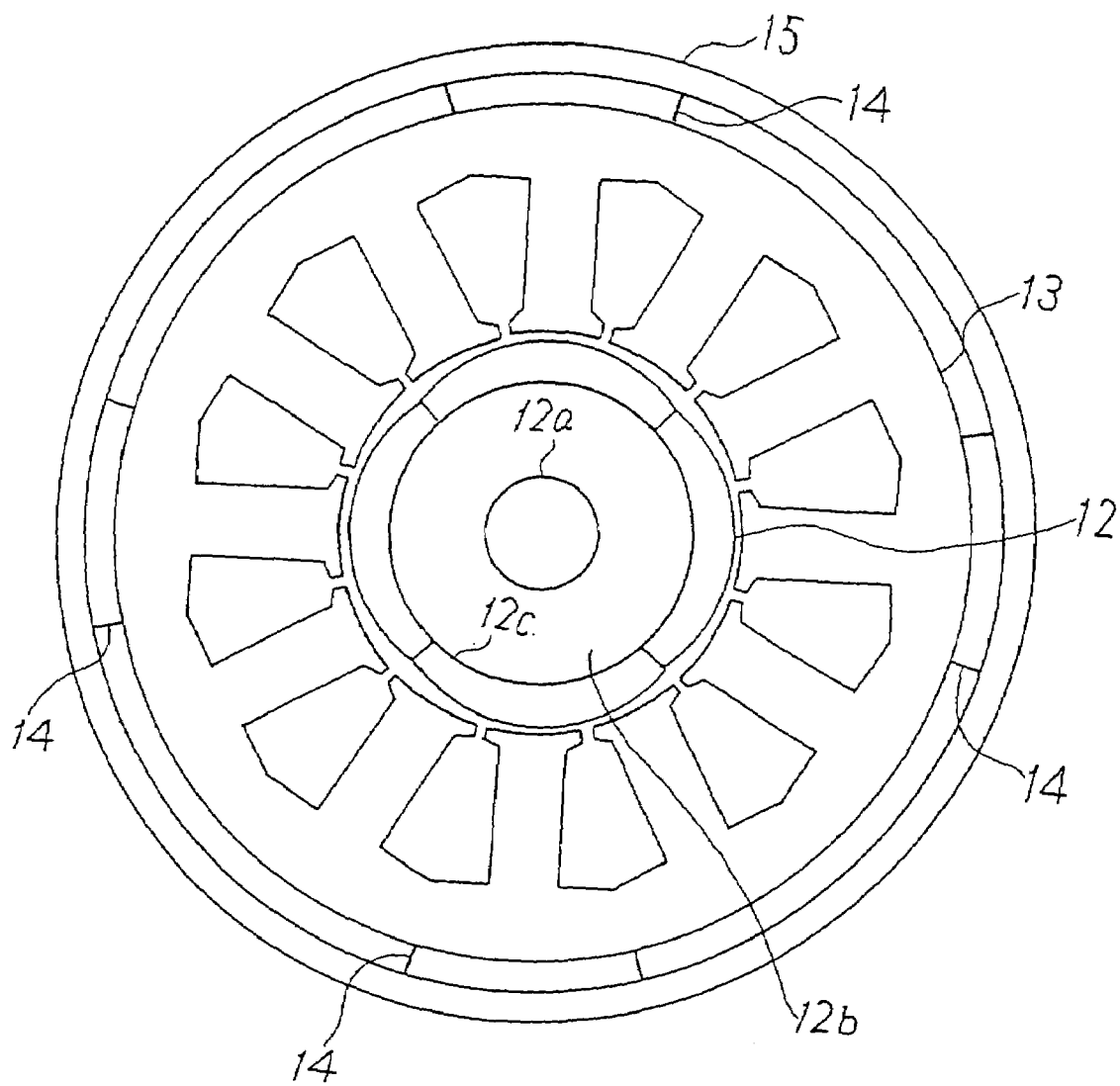
FIG. 15 is a view showing a cross section perpendicular to an axial direction of a permanent-magnet type synchronous motor according to an embodiment 10 of the invention.

FIG. 15 is a cross sectional view showing a permanent-magnet type synchronous motor according to the embodiment 10. In contrast to the embodiment 6, a rotor has 4 poles and a stator has 12 slots in the present embodiment. Also, magnets 12c in the embodiment are ideally arranged to provide for a uniform and symmetrical magnetic flux density distribution. On the other hand, since the stator 13 includes nonuniform portions in terms of manufacture, pulsating components are contained in permeance. An influence, which is produced on a product by the pulsating components, will be described later.

Also, at the time of measurement of cogging torque in the permanent-magnet type synchronous motor, according to the embodiment 10, with 4 poles and 12 slots, components of 4 times being the same number as the number of poles of the rotor 1 are in some cases contained per one revolution of the rotor 1.

While the embodiments 6 to 9 have been described with respect to the case of a plus minimum value among the calculated solutions of N, cogging torque is in some cases decreased even in the case where a solution of N is not a minimum value, when components having an opposite phase to that of pulsating components of N times in the permeance distribution function formed by the stator 13 are given. In 4 poles and 12 slots in the embodiment 10, pulsating components of N times in the permeance distribution function where N=4 is a plus value among values calculated from N=2, N=±2×2−12×0, or N=12×0±2×2 assuming that i1=0 in the formula relating to the number N of pulsating components are generated.

In addition, while an explanation is given centering on i1>0 in the Non-Patent Document 1, even i1≧0 is established theoretically since i1 is a spatial order when the permeance distribution function is expanded in Fourier series. When the formulae (2), (3) are established, the smaller i1, the larger an amplitude of cogging torque.

As shown in FIG. 15, four pressurizing parts 14, four being equal to the times 4 of pulsating components contained in the permeance distribution function of the stator 13 are prepared, a point, at which cogging torque is zero in measurement of cogging torque, or a neighborhood thereof makes a first position of pressurization, and the remaining positions of pressurization are arranged at equal angular intervals. Predetermined stress and displacement are given to the stator 13 by press fitting the pressurizing parts between an armour frame 14 and the stator 13. The stress changes the stator 13 locally in relative permeability.

A change, in relative permeability, caused by displacement and stress of the stator 13 results in pulsations of 4 times per one revolution of the rotor 12 as an air gap length between the stator 13 and the rotor 12, and relative permeability also results in pulsations of 4 times per one revolution of the rotor 12 due to stress of a back yoke of the stator 13. Therefore, when the positional relationship of the stator 13 and the rotor 12 is put in order, the permeance distribution function also gives components having an opposite phase to that of pulsating components of 4 times.

In this case, it has been confirmed that cogging torque is decreased before and after pressurization by the pressurizing parts 14. Accordingly, the permeance distribution function also generates pulsating components of 4 times, and pressurization by the pressurizing parts 14 makes it possible to give components having an opposite phase to that of the pulsating components.

As described above, since the embodiment comprises the stator 13 having 12 slots, on which a coil is arranged, the rotor 12 having permanent magnets of 4 poles and inserted into a torus of the stator 13, and the pressurizing parts 14 that pressurize an outer periphery of the stator 13 inward in N locations, N being a plus minimum value found from the formula (1) N=p, or the formula (2) N=±2 p−i1×Z, or the formula (3) N=i1×Z±2 p, stress and displacement by the stress are imparted to the stator 13 in predetermined locations to cancel pulsating components of 4 times, in permeance, formed by the stator 13, thereby enabling decreasing cogging torque having pulsating components of the same number as the number of poles of the rotor 12.

With the embodiment, N=2 is obtained from the formula (1), N=±2×2−12×0=4 is obtained from the formula (2), or N=12×0±2×2=4 is obtained from the formula (3). 4 being a plus value is adopted among these values of N, and pressurization is applied in four locations.

In addition, the same effect can be obtained even in the case where in place of the pressurizing parts 14 and the armour part 15, the frame 15 is press fitted into the stator 13 in the same manner as in the embodiment 8.

EMBODIMENT 11

The embodiment 11 will be described with respect to the case where a permanent-magnet type synchronous motor according to the embodiment 10 is applied to the manufacturing method according to the embodiment 9.

An explanation is given to a difference in processes between the embodiment and the embodiment 9. In the process of determining the number of those locations, in which the stator 13 is pressurized, from data of cogging torque of the rotor 12 every angle, determination is made by the use of a plus minimum numeral among solutions of N, which meet any one of N=p, N=±2 p−i1×Z, and N=i1×Z±2 p, in the embodiment 9, while the embodiment 11 is different from the embodiment 9 in that N is determined to be 4 in view of the case where pulsating components of N=4 being a plus value, in the permeance distribution function are generated. A permanent-magnet type synchronous motor can be manufactured by making subsequent processes the same as those in the embodiment 9.

Accordingly, since the embodiment 11 comprises the step of inserting and assembling the rotor 12 having permanent magnets of 4 poles (P is a natural number) into the stator 13 formed to be torus-shape and having 12 slots, on which a coil is arranged, the step of rotating the rotor 12 in a state, in which electric current is not caused to flow through the coil 18, to measure cogging torque every angle, the step of determining those locations, in which the outer periphery of the stator 13 is pressurized, on the basis of measurements of cogging torque, and the step of assembling the pressurizing parts 14, which pressurize the outer periphery of the stator 13, to an outside of the stator 13 in four locations, four being a plus minimum value calculated from N=2, N=±2×2−12×0, or N=12×0±2×2, a state of cogging torque before the outer periphery of the stator 13 is pressurized in predetermined locations is made use of, so that the cause for generation of cogging torque can be dealt with as a black box and components caused by non-uniformity of cogging torque every slot can be decreased in case of whatever cause, whereby it is possible to decrease cogging without investigating the cause for cogging torque.

In addition, in the case where cogging torque of the same number as the number of poles of the rotor 12 is not generated in the step of measuring cogging torque, a part in the form of an ordinary circular pipe for fixation of the stator 13 may be used to fix the stator 13 without the use of the pressurizing portions 14 having a structure for pressurization and the frame

The invention claimed is:

1. A permanent-magnet synchronous motor comprising:
a toroidal stator core having an outer periphery, a plurality of internal radial teeth, and Z slots, each slot separating a pair of teeth, and a coil arranged on the stator core, wherein Z is a natural number;
a rotor having permanent magnets with 2 p poles, the rotor being disposed within the toroidal stator core, wherein p is a natural number; and
a pressurizing part that applies a local extreme pressure to the outer periphery of the toroidal stator core, radially inwardly, at each of N locations, wherein
N is any one of positive values of values chosen from values calculated from N=p, N=±2 p−Z(i1), and N=Z (i1)±2 p,
i1 is an integer and at least 0, and
the N locations are chosen so that each local extreme pressure applied is aligned with a center line of at least one of the radial teeth.

2. The permanent-magnet synchronous motor according to claim 1, wherein N is the positive minimum value of the values calculated from N=±2 p−Z(i1), and Z(i1)±2 p.

3. The permanent-magnet synchronous motor according to claim 1, wherein the pressurizing part comprises a frame that fixes the stator core in position with respect to the frame and rotatably supports one end of the rotor.

4. A permanent-magnet synchronous motor comprising:
a toroidal stator core having an outer periphery, a plurality of internal radial teeth, and Z slots, each slot separating a pair of teeth, and a coil arranged on the stator core, wherein Z is a natural number;

a rotor having permanent magnets with 2 p poles, the rotor being disposed within the toroidal stator core, wherein p is a natural number; and a pressurizing part that applies a local extreme pressure to the outer periphery of the toroidal stator core, radially inwardly, at each of N locations, wherein N is any one of positive values of values chosen from values calculated from N=p, N=±2 p−Z(i1), and N=Z(i1)±2 p, i1 is an integer and at least 0, and the N locations are chosen so that each local extreme pressure applied is aligned with a center line of at least one of the slots.

5. The permanent-magnet synchronous motor according to claim 4, wherein N is the positive minimum value of the values calculated from N=±2 p−Z(i1), and Z(i1)±2 p.

6. The permanent-magnet synchronous motor according to claim 4, wherein the pressurizing part comprises a frame that fixes the stator core in position with respect to the frame and rotatably supports one end of the rotor.

* * * * *